(12) United States Patent
Booij et al.

(10) Patent No.: US 10,794,692 B2
(45) Date of Patent: *Oct. 6, 2020

(54) OFFSHORE POSITIONING SYSTEM AND METHOD

(71) Applicant: FNV IP B.V., Leidschendam (NL)

(72) Inventors: Olaf Booij, Leiden (NL); Fatemeh Karimi Nejadasl, Delft (NL); Evert Schippers, Amsterdam (NL); Hendrik Wouters, The Hague (NL)

(73) Assignee: FNV IP B.V. (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/388,718

(22) Filed: Apr. 18, 2019

(65) Prior Publication Data

US 2019/0242700 A1 Aug. 8, 2019

Related U.S. Application Data

(63) Continuation of application No. 14/770,761, filed as application No. PCT/NL2013/050127 on Feb. 28, 2013, now Pat. No. 10,323,941.

(51) Int. Cl.
*G06T 7/70* (2017.01)
*B63B 79/00* (2020.01)
(Continued)

(52) U.S. Cl.
CPC .............. *G01B 11/26* (2013.01); *B63B 35/04* (2013.01); *G01B 11/272* (2013.01); *G01C 9/00* (2013.01);
(Continued)

(58) Field of Classification Search
CPC ............ G01B 11/26; G06T 7/70; B63B 79/00
See application file for complete search history.

(56) References Cited

U.S. PATENT DOCUMENTS 4,257,718 A * 3/1981 Rosa ................. F16L 1/225
405/167
4,435,108 A * 3/1984 Hampton ............... E21B 7/128
175/7
(Continued)

FOREIGN PATENT DOCUMENTS

EP  1744122 A2  1/2007
EP  2154542 A1  2/2010
(Continued)

OTHER PUBLICATIONS

International Search Report for PCT application No. PCT/NL2013/050127;dated Dec. 12, 2013.
(Continued)

*Primary Examiner* — Rowina J Cattungal
(74) *Attorney, Agent, or Firm* — Polsinelli PC

(57) ABSTRACT

A system for measuring the attitude of an object in a fixed frame of reference from a moving frame of reference, comprising a first imaging device for producing image data for the object from a first direction, a second imaging device for producing image data for the object from a second direction having a component perpendicular to the first direction and an attitude sensing arrangement for determining an attitude of the first and second imaging devices with respect to the fixed frame of reference at the time the respective images are taken and for generating attitude data. An image processing system analyses and combines the respective image data and attitude data to determine the attitude of the object. The system is particularly useful for determining attitude of offshore piles during piling operations or for monitoring the departure angles of pipes and cables during laying thereof.

21 Claims, 5 Drawing Sheets

(51) Int. Cl.
  *G01B 11/26* (2006.01)
  *H04N 7/18* (2006.01)
  *B63B 35/04* (2006.01)
  *G01B 11/27* (2006.01)
  *G01C 9/00* (2006.01)

(52) U.S. Cl.
  CPC .............. *G06T 7/70* (2017.01); *H04N 7/181* (2013.01); *B63B 79/00* (2020.01)

(56) References Cited

U.S. PATENT DOCUMENTS

| | | | | |
|---|---|---|---|---|
| 6,826,452 | B1* | 11/2004 | Holland | B66C 1/663 |
| | | | | 318/566 |
| 6,901,171 | B1* | 5/2005 | Dutta-Choudhury | G06T 7/12 |
| | | | | 382/199 |
| 9,189,858 | B2* | 11/2015 | Svanholm | G01C 1/04 |
| 2004/0109059 | A1* | 6/2004 | Kawakita | H04N 7/18 |
| | | | | 348/143 |
| 2006/0167648 | A1* | 7/2006 | Ohtani | G01C 1/04 |
| | | | | 702/150 |
| 2008/0225127 | A1* | 9/2008 | Ming | H04N 5/2628 |
| | | | | 348/208.99 |
| 2009/0262974 | A1* | 10/2009 | Lithopoulos | G01S 17/89 |
| | | | | 382/100 |
| 2010/0230370 | A1* | 9/2010 | Schneider | B66C 23/52 |
| | | | | 212/276 |
| 2011/0040425 | A1* | 2/2011 | Tink | G01C 21/165 |
| | | | | 701/2 |
| 2011/0074674 | A1* | 3/2011 | Walberg | G06F 3/0428 |
| | | | | 345/158 |
| 2011/0140420 | A1 | 6/2011 | Loh et al. | |
| 2011/0191058 | A1* | 8/2011 | Nielsen | G01V 3/38 |
| | | | | 702/130 |
| 2014/0107971 | A1* | 4/2014 | Engedal | G01B 21/00 |
| | | | | 702/150 |
| 2016/0005185 | A1* | 1/2016 | Geissler | G06T 7/246 |
| | | | | 348/47 |

FOREIGN PATENT DOCUMENTS

| | | |
|---|---|---|
| EP | 2392991 A1 | 7/2011 |
| NL | 2014133381 A1 | 9/2014 |

OTHER PUBLICATIONS

Notification of Transmittal of the International Preliminary Report on Patentability for PCT application No. PCT/NL2013/050127;dated May 13, 2015.

* cited by examiner

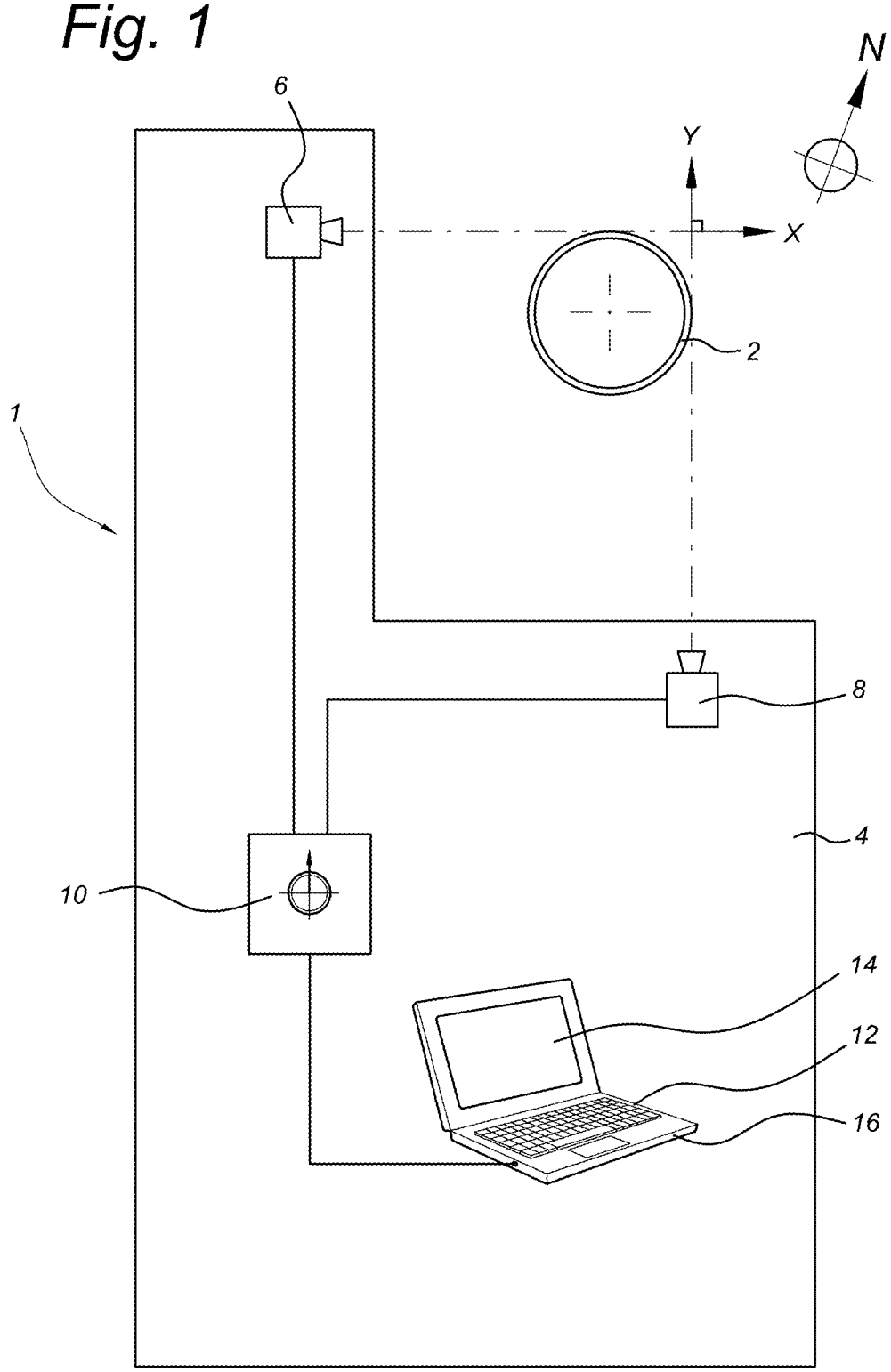

OFFSHORE POSITIONING SYSTEM AND METHOD

BACKGROUND

Field of the Invention

The present invention relates to devices and systems for determining an attitude of an object in a fixed frame of reference by observations from a moving frame of reference and more particularly to a system capable of accurately measuring the verticality of a pile or similar object from a floating platform or vessel. The invention also relates to a method of performing such measurements.

Description of the Related Art

Engineering operations at sea often involve considerable difficulty due to the constant movement of the waves. This is especially the case when accuracy is required in performing measurements. For a vessel at sea, measurements may be made in a fixed frame of reference relative to the earth or in a moving frame of reference relative to the vessel.

One situation where measurements in the absolute frame of reference are relevant is in the installation of fixed structures from a floating platform or vessel. In recent years large numbers of offshore structures have been installed on or in the sea bed, including wind turbines, drilling platforms, bridges, cables, pipelines and the like. The installation work is generally performed from a suitable barge or vessel using cranes and other lifting facilities. In the case of wind turbines, a single pile may be driven into the seabed using a hydraulic hammer or other pile-driving facility mounted on a heavy lift vessel. These monopiles should be installed vertically and it is essential that during driving the verticality is continuously monitored and, where necessary, corrected. At present, the procedure for performing such measurements involves a human operator approaching the monopile and performing a manual measurement of the structure using a handheld inclinometer. This measurement thus takes place directly in the fixed frame of reference of the monopile. During measurement, the pile-driving must be stopped. After evaluation of the results, the crane operator must be informed of the results and instructed with respect to the required corrective action.

In the case of laying of cable from a cable lay vessel, it may be desirable to closely monitor the angle of deployment of the cable in order to determine its trajectory to the seabed. In conventional systems this may be achieved by locating an angle sensor against the cable at the departure location. The sensor may be a pitch and roll type angle sensor which requires direct contact with the cable for operation. Positioning of such sensors can be difficult and they may require frequent attention e.g. on passing joints on the cable. They may also be easily damaged, especially when laying multiple cables and at present are not applicable to all situations. Similar considerations apply during pipe-laying.

It would be desirable to provide a system that simplified such measurements and could be implemented in real time without interrupting operations.

BRIEF SUMMARY OF THE INVENTION

According to the invention there is provided a system for measuring an attitude of an object in a fixed frame of reference from a moving frame of reference, the system comprising: a first imaging device for producing image data for the object from a first direction; a second imaging device for producing image data for the object from a second direction having a component perpendicular to the first direction; an attitude sensing arrangement for determining an attitude of the first and second imaging devices with respect to the fixed frame of reference at the time the respective images are taken and for generating attitude data; and an image processing system for analyzing and combining the respective image data and attitude data to determine the attitude of the object. By the use of imaging devices, observations may be made at a distance from the object to be measured. Measurements may thus take place without requiring anyone to be in the direct vicinity of the object. The measurements may be taken from any distance. Preferably, the distance is between 0.5 meters and 100 meters, more preferably between 5 meters and 30 meters. In most cases, the first direction and the second direction will be generally perpendicular to each other, although there is usually no requirement of exact perpendicularity. In the present context, attitude is intended to refer to the orientation of a coordinate frame attached to the object with respect to another frame, such as a geodetic reference frame or an earth-fixed frame associated with a local direction of gravity, and may be expressed in terms of the degrees of deviation with respect to the reference axis. In general, attitude will be understood to cover three degrees of freedom, namely pitch, roll and yaw. Nevertheless, it will be understood that in certain circumstances, just two degrees of freedom such as pitch and roll may be monitored within a defined body frame having an arbitrary heading such as the vessel reference frame. Alternatively, inclination and inclination direction may be monitored, for instance for an upright object with axial symmetry.

The attitude sensing arrangement may be any suitable device capable of recording the local orientation or attitude of the respective image device with respect to the fixed reference frame. In many cases such devices are referred to as inertial measurement units (IMU) but this is not intended to be restrictive on any particular principle of operation. In particular, the attitude sensing arrangement may be based on mechanical gyroscopic action, fiber optic gyroscopes (FOG), laser ring gyroscopes (LRG), MEMS based technologies, accelerometers, magnetometers, pendulum, electrolytic inclinometers, liquid capacitive inclinometers or any combination of the above. Most preferably, the attitude sensing arrangement also comprises a heading indicator allowing momentary determination of the attitude of the imaging devices with respect to the earth, in particular, geodetic or magnetic north. The attitude sensing arrangement should preferably have a dynamic accuracy of better than 1.0°, more preferably better than 0.5° and most preferably better than 0.2°, at least in the pitch and roll directions.

In a simple embodiment, the attitude sensing arrangement may comprise a single attitude sensor for both imaging devices. This single device could be a pitch and roll sensor calibrated to the vessel or could be a three axis attitude sensor with north-seeking capability. In both these cases, the positions of the first and second imaging devices must remain fixed relative to each other within the moving frame of reference from initial set-up. Such a system may be used in combination with a ship's IMU or attitude sensor, whereby the first and second imaging devices are located at fixed locations. In a more preferred embodiment, first and second attitude sensors are provided, each integrated with a respective imaging device for movement therewith. Each local attitude sensor may be a non-north seeking attitude sensor whereby readings within a vessel frame of reference may be determined if the position of the imaging device relative to the vessel is accurately established. It will also be appreciated that each local attitude sensor could even be a single axis attitude sensor, whereby more constraints would be required on the positioning of the imaging devices and on the resulting attitude determination. The system has considerable additional advantage if each of the attitude sensors is a 3-axis attitude sensor with north-seeking capability. In this case, each imaging device can be relocated together with its attitude sensor and can instantly commence measurement, since it automatically knows its own heading. Since the heading of the observation is now defined in the geodetic reference frame, it allows pitch and roll to be defined and computed for any arbitrary absolute heading. This heading could be e.g. North or, when the vessel heading is known, the heading of the vessel. This allows considerable versatility since an imaging device can easily be repositioned if its view is obscured or if it is otherwise inconvenienced. As a further consequence of the dedicated 3-axis north-seeking attitude sensor, each imaging unit may in fact be located in its own frame of reference, moving independently of each other. It will thus be understood that they may even be located on different vessels or that theoretically one or both of the imaging devices may be portable and hand held during measurement.

According to an important aspect of the invention, the system further comprises a clock, arranged to time stamp the attitude data. In order to effectively process the image data and the attitude data, there must be close correlation in time between the respective measurements. For operation on board a moving vessel, the attitude may change very rapidly and the attitude data should preferably be time stamped to an accuracy of at least 1 ms. Most preferably, the time stamp will be accurate to around 0.1 ms. The required timing accuracy, including unaccounted processing and communication latencies, may be expressed as a function of the required measurement precision and the expected movement rate of the moving frame. For example on board a vessel, it may be desirable that the timing accuracy should be better than the required pitch and roll measurement accuracy divided by the maximum expected angular rate of the vessel. The required relative timing accuracy between the first and second imaging devices may be less critical, especially if an expected angular rate of movement of the object is very low compared to variations in the moving reference frame. Even the difference between capture time and transmission time may need to be taken into account in order to ensure that the correct data items are associated to one another. The clock may be a local clock applicable to the attitude sensor and its associated imaging device or devices. Most preferably, the clock is linked to a global timing system such as GPS, which allows readings to be correlated with other events such as a global position indication. Preferably the clock also issues a clock signal for synchronizing a capture time of the image data. The skilled person will be well aware of various options for ensuring that the image data and attitude data are accurately synchronized to such a clock signal.

As discussed above, the invention is particularly applicable for mounting aboard a vessel. In that case, according to a preferred embodiment of the invention, the attitude of the object may be given with respect to a heading of the vessel. For a vertical object such as a pile, the attitude will preferably be the inclination of the pile and its direction. The direction of inclination of the top of the pile with respect to the base can then be displayed relative to the bow of the vessel. For a crane or pile driver mounted to and moving with the vessel, corrective action may be more easily taken in this local reference frame. It is however not excluded that the attitude of the object is also or alternatively given with respect to a geodetic coordinate frame.

In an alternative configuration, the device may be used for monitoring a pipe or cable laying operation by monitoring the direction of departure of a pipe or cable string from a vessel. The attitude of the string at departure can be used to compute the trajectory of the string to the seabed. Of particular interest is the angle of the string with respect to the vertical (or horizontal direction). The departure heading may be determined based on position data for the vessel and the point of contact with the seabed, although it is not excluded that the heading of the string could also be determined by the claimed device.

According to a yet further advantage of the invention, the system also comprises a calibration facility. This may be arranged to calibrate the total body-frame roll axis error of a respective imaging device and the attitude sensing arrangement. In this context, total body-frame roll is intended to refer to the combined error due to both the attitude sensor accuracy and any misalignment between the mounting of the camera and attitude sensor. This may be accomplished by taking an image of the horizon, which by definition must be horizontal. Frequent self-checks can be carried out, which have the advantage that a device can be verified to work correctly in the marine environment. Distortions arising from e.g. shipment of the unit, resulting in increased measurement errors, can be easily detected using such a method.

According to a still further aspect of the invention, the system allows measurement and determination of the attitude in real time. There may also be an attitude display providing a real-time representation of the attitude of the object. One particularly convenient display is in the form of a sight glass or spirit level, allowing an operator to monitor deviation of the object from a desired attitude. The system may also or alternatively comprise a user interface and an image display. In one convenient form, the image processing system may be arranged such that a user can manually pick a portion of an image of the object on the display for use in determining the attitude of the object. The portion of the object may be a characteristic edge or marking on the object and picking may take place using a mouse or similar pointer to identify the portion on the image display. Additional software may be provided for locking the image based on image recognition of the characteristics of the portion. This can be of use in situations where the object becomes partially obscured and a human operator may more reliably identify the relevant portions.

Although the system may be used for determining the orientation or attitude of many alternative objects, it is particularly suitable for use in determining the verticality of a pile, more specifically the sort of pile or monopile used for offshore wind turbine generators. In one embodiment of the system, the image processing system is arranged to: determine left and right borders of the pile from the first imaging device and identify a location of the plane therebetween that passes through the first imaging device; determine left and right borders of the pile from the second imaging device and identify a location of the plane therebetween that passes through the second imaging device; and combine the location of the planes from both the first and second imaging devices to determine the attitude of the axis of the pile. Assuming that the pile is rotationally symmetric, the mid-plane between the edges will identify the central axis irrespective of the direction of viewing. This makes it considerably easier to evaluate the results, as it is independent of the distance between the imaging devices and the pile. It is also applicable even when the pile tapers.

The invention also relates to a device for measuring an attitude of an object in a fixed frame of reference from a moving frame of reference, the device comprising: an imaging device for producing image data for the object; an attitude sensor for determining an attitude of the imaging device with respect to the fixed frame of reference at the time the image is taken and for generating attitude data; and a communication port for transmitting data to a data processing system for determining or displaying the attitude of the object. In a simple form, the attitude sensor may be a one- or two-axis attitude sensor without north-seeking capability. It will be understood that north-seeking devices are considerably more expensive and a simple non north-seeking device may be more than adequate for many purposes, especially when used e.g. in combination with a ship's north-seeking facility or with additional GPS positioning. A more complex embodiment of the invention provides a single device in which the imaging device and a north-seeking attitude sensor are integrated. Such a device is extremely versatile and can in fact be moved to a given location and immediately provide relevant input for determining the attitude of the object. This may be the case, even when the absolute position is unknown, based merely on the attitude information. It will be understood that the data transmitted may be the image data and the attitude data. In this case, the remote data processing system may include an image processing system for analyzing and combining the image data and attitude data to determine the attitude of the object as described above. Alternatively, an image processing system may be provided in the device and the transmitted data may comprise partially processed data related to the attitude of the object. The device may also include a local image display and user interface.

According to an embodiment, the device may comprise a clock, arranged to time stamp the image data relative to the attitude data. The clock may be a local clock or may be a clock signal derived from an external source such as the data processing system or a satellite navigation system. Stamping the image and attitude data in an accurate manner is of importance in ensuring that they are coherent, especially when analysis takes place subsequently. The clock or time stamp facility may be part of a real-time signal multiplexer that combines the attitude data and the image data.

Most preferably, the device is portable and the imaging device and the attitude sensor are fixed to each other to prevent relative movement. By portable, it is understood that the device is of a size and weight to be easily carried and set up by one person. It will be understood that such a device may even be used alone to provide measurements from two directions by moving from a first position to a second position. Such a device could be mounted on a separate vessel, movable with respect to the object being measured.

It will be further understood that various imaging devices may provide the desired function. These may include laser imaging devices, infra-red imaging or conventional camera based imaging devices. Most preferably, the imaging device is a camera having automatic iris control, allowing use in varying lighting conditions. It will be understood that, throughout the day, the position of the sun will vary and it may be undesirable to shift the imaging device when the lighting condition is bad. Automatic lighting control can mitigate this difficulty, allowing the operator to continue measurements from the same location. Additional desirable characteristics of the camera include anti-smearing and anti-blooming correction to further improve image quality.

In a still further embodiment, the device further comprises a calibration facility arranged to calibrate the attitude sensor for determining an attitude of the imaging device with respect to the horizon. The mounting of the attitude sensor to the imaging device is preferably robust. Nevertheless, when using the device for extended periods or in the event that it has been subject to shock, it may be desirable to have a simple self test possibility. This may be achieved by calibrating it against the horizon, which, for offshore locations, provides an accurate horizontal axis. The calibration facility may be partially local and partially remote e.g. with an image processing system being used to identify the horizon in the same way as identification of the object takes place.

According to a further desirable embodiment, the device may also comprise a satellite positioning system providing position data for the imaging device. Although it is not directly required to know the exact location of the device in order to determine attitude of the object, additional benefits may be achieved by knowing location. It will be understood that position data for the device in combination with position data for the object could also be used to provide the heading requirement of the device. The satellite positioning system may be any GNSS (e.g. GPS, Glonass or both) or based on any other system capable of reliably determining position.

The invention also relates to a vessel comprising the system or the device as defined above. The vessel may be any vessel, including but not limited to, a heavy lift barge performing pile driving operations, a cable or pipe laying vessel, an ROV or a support vessel to one or more such vessels.

The invention further relates to a method of determining an attitude of an object in a fixed frame of reference based on observations from a moving frame of reference and a computer program product for implementing the method. The method may comprise: viewing the object from a moving frame of reference in a first direction to produce a first image data set; viewing the object from a moving frame of reference in a second direction to produce a second image data set; collecting attitude data representing a relative attitude of the moving frame of reference with respect to the fixed frame of reference for each image data set; and analyzing and combining the respective image data and attitude data to determine the attitude of the object. The method may be carried out using the system or device as described above or hereinafter and is particularly directed to determining the verticality of an offshore pile during driving thereof or of a cable or pipe during an offshore laying operation.

BRIEF DESCRIPTION OF THE DRAWINGS

The features and advantages of the invention will be appreciated upon reference to the following drawings of a number of exemplary embodiments, in which:

FIG. 1 shows a schematic view of a first embodiment of the present invention;

DETAILED DESCRIPTION

Figure 2A:
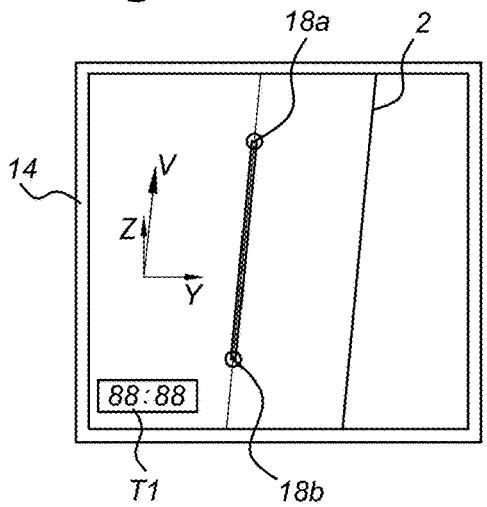
FIGS. 2A and 2B show images taken by the first and second cameras of the embodiment of FIG. 1.

FIG. 1 shows a schematic view of a system 1 for measuring the attitude of a monopile 2 according to a first embodiment of the invention. The system 1 is mounted upon a barge 4, which is being used for installation of the monopile 2. Cranes and pile-driving equipment is not shown for the sake of convenience but may be otherwise conventional.

The system 1 comprises a first camera 6 and a second camera 8 mounted on the barge 4 within view of the monopile 2 and directed towards it. The cameras 6, 8 are mounted to view the monopile from orthogonal directions i.e. the lines of sight from the respective camera to the monopile are perpendicular to each other. As will be understood by the skilled person in the following, these directions need not be perfectly perpendicular. In the present embodiment, the first camera 6 is aimed along a left hand edge of the monopile 2 and is aligned across the barge 4 in a direction denoted X. The second camera 8 is aimed at a right hand edge of the monopile and directed in the direction denoted Y with respect to the frame of reference of the barge 4. Also aboard the barge 4 are a 3-axis north-seeking attitude sensor 10 and an image processing system 12 including an image display 14 and a user interface 16. The image processing system 12 is in fact a standard computer running dedicated software.

FIG. 2A is an image taken by the first camera 6 at a time T1 as viewed on the image display 14. It shows the monopile 2 and an indication of the Z and Y directions, together with an indication of the time T1. The Z direction is the vertical direction within the moving frame of reference of the barge 4. V is the true vertical within the geodetic coordinate frame. The image display 14 also includes pointers 18A, B that can be manipulated through the user interface 16, e.g. by use of a mouse or the like.

Figure 2B:
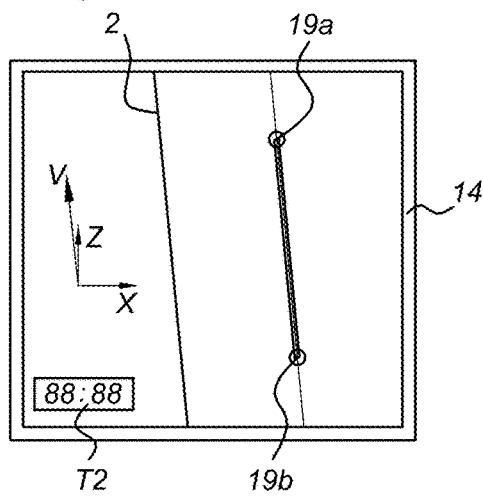

FIG. 2B is an image taken by the second camera 8 at a time T2 as viewed on the image display 14. It shows the monopile 2 and an indication of the Z (local-vertical), V (geodetic vertical) and X directions, together with an indication of the time T2. Also shown are pointers 19A, B.

Figure 2C:
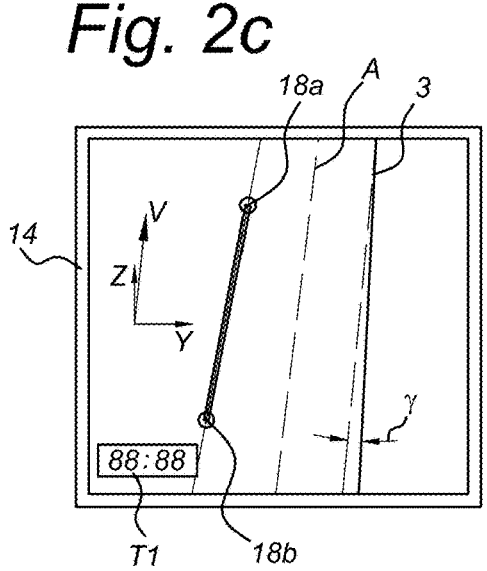
FIGS. 2C and 2D show images taken by the first and second cameras of a tapered monopile in an alternative embodiment.
Figure 2D:
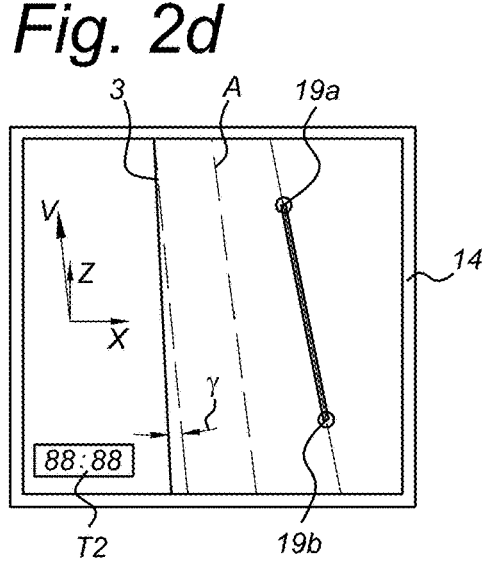

FIGS. 2C-2D show images taken by the first and second camera 6, 8, in another case wherein the imaged monopile 3 has a slightly tapered shape. Here, the tapered pile 3 has a truncated conical outer pile surface for which a radial distance from a nominal central axis A of the pile 3 changes slowly and linearly as a function of axial distance along the axis A. The tapered shape of the outer pile surface may be described by a non-zero taper angle γ relative to the axis A.

Figure 2E:
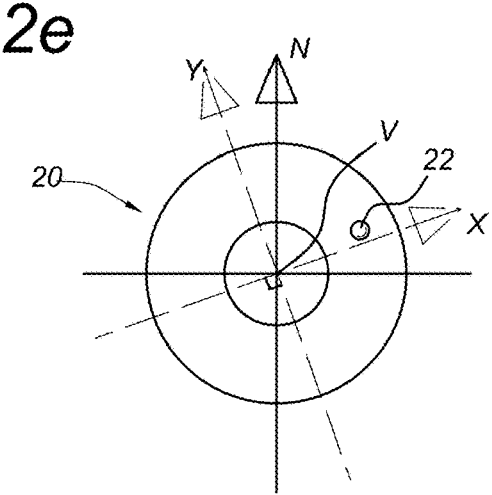
FIG. 2E shows an attitude display of a monopile during use of the invention of FIG. 1.

FIG. 2E shows an attitude display 20 in a single spirit-level representation of the attitude of the monopile 2. A bubble 22 indicates the position of the monopile with respect to the vertical V in the fixed reference frame. The attitude display 20 shows the magnetic or geodetic North direction N, giving attitude in the fixed reference frame and can also show the X and Y directions allowing the attitude of the monopile 2 to be seen within the local frame of reference. The attitude display 20 may be provided on the crane operator or pile driver's display and may also be displayed on the image display 14.

Operation of the system 1 will now be described with reference to FIGS. 1 and 2A, 2B. In use, once the monopile 2 has been placed at the correct location and driving has commenced, it is effectively fixed within the geodetic frame of reference of the earth. It still moves slowly due to the driving operation but this slow movement may be ignored for the further discussion. Images are taken and displayed on the image display 14 as shown in FIGS. 2A and 2B with an update frequency, e.g., of around 1 Hz. A user operating the system 1 uses the user interface 16 to identify two points on the left hand edge of the monopile 2 in FIG. 2A using pointers 18A and 18B. The image processing system 12 accurately identifies the chosen edge and locks onto it using an edge detection software module. Such a module is generally conventional software capable of pixel analysis to determine an edge of an object and is not further discussed here. Once the edge is detected, the image processing system 12 can accurately represent the position of this edge within the ZY frame of reference of the barge 4 for the time T1. Thereafter, the image processing system 12 can continue to follow the edge without requiring reselection, unless the image should become obscured for some reason. The image processing system 12 also receives attitude data from the attitude sensor 10 which is time-stamped as having been measured at time T3. The attitude data is sampled at a rate of e.g. 100 Hz and interpolation is used between these values to match the image data at times T1 and T2 to the attitude data at time T3. This allows an evaluation of the offset of the true vertical V with respect to the local vertical Z at the time T1. The same is repeated for the image of the second camera 8 taken at time T2 as shown in FIG. 2B.

As illustrated in FIGS. 2A-D, the system 1 may operate in a single-edge-per-camera mode, wherein it determines the inclination of the monopile while detecting and tracking just one of the two pile edges that are visible in each camera image. In single-edge-per-camera mode, the system 1 simultaneously tracks two pile edges, one edge selected from each one of the two camera images that are (quasi-)synchronously acquired from the two (approximately) orthogonal viewing directions X and Y. For a cylindrical pile 2 (FIGS. 2A-B), the system 1 is configured to determine and track the attitude of the pile 2 based on a position and orientation of the border plane intersecting the two points 18A, 18B on a left hand edge of the monopile 2 in FIG. 2A, as well as on the position and orientation of the further border plane intersecting the two points 19A, 19B on a right hand (trailing) edge of the monopile 2 in FIG. 2B. For the tapered pile 3 (FIGS. 2C-D), the taper angle γ of the radial outer pile surface relative to the central pile axis A should be supplied to the system 1 in advance. In this case, the system 1 is configured to determine the attitude (e.g. inclination and inclination direction) of a central axis A of the pile 3 based on the positions and orientations of the border planes corresponding with the points 18A, 18B, 19A, 19B along the edges of the monopile 3, and on the predetermined value for the taper angle γ. In cases wherein the non-zero taper angle γ for the pile 3 is smaller than the pile orientation angle measurement accuracy achievable by the system 1, it may be preferred to let the system 1 rely on a cylindrical pile model (by inputting γ=0°) in order to simplify calculations.

Once both images have been analyzed, the results may be combined in the single spirit-level representation of the attitude display 20 as shown in FIG. 2E. As the first and second cameras 6, 8 track the monopile, the position of the bubble 22 changes in real time and the engineer or surveyor can give directions for corrective action to the operator of the pile driver.

In the first embodiment of FIG. 1, a single attitude sensor is used, which is the ship's own IMU. The cameras 6, 8 are high resolution digital cameras operating according to GigE vision protocol and having automatic iris control and anti-smearing and anti-blooming correction. This allows them to compensate for changing light conditions. Nevertheless, movement of the cameras 6, 8 with respect to the barge is undesirable, as this would require significant recalibration in order to define their relative positions in the local reference frame. Consequently, such an arrangement may be unsuitable where the location of the monopile 2 with respect to the barge 4 may change e.g. from one operation to the next or where significant chance of obstruction of one of the cameras is present.

Figure 3:
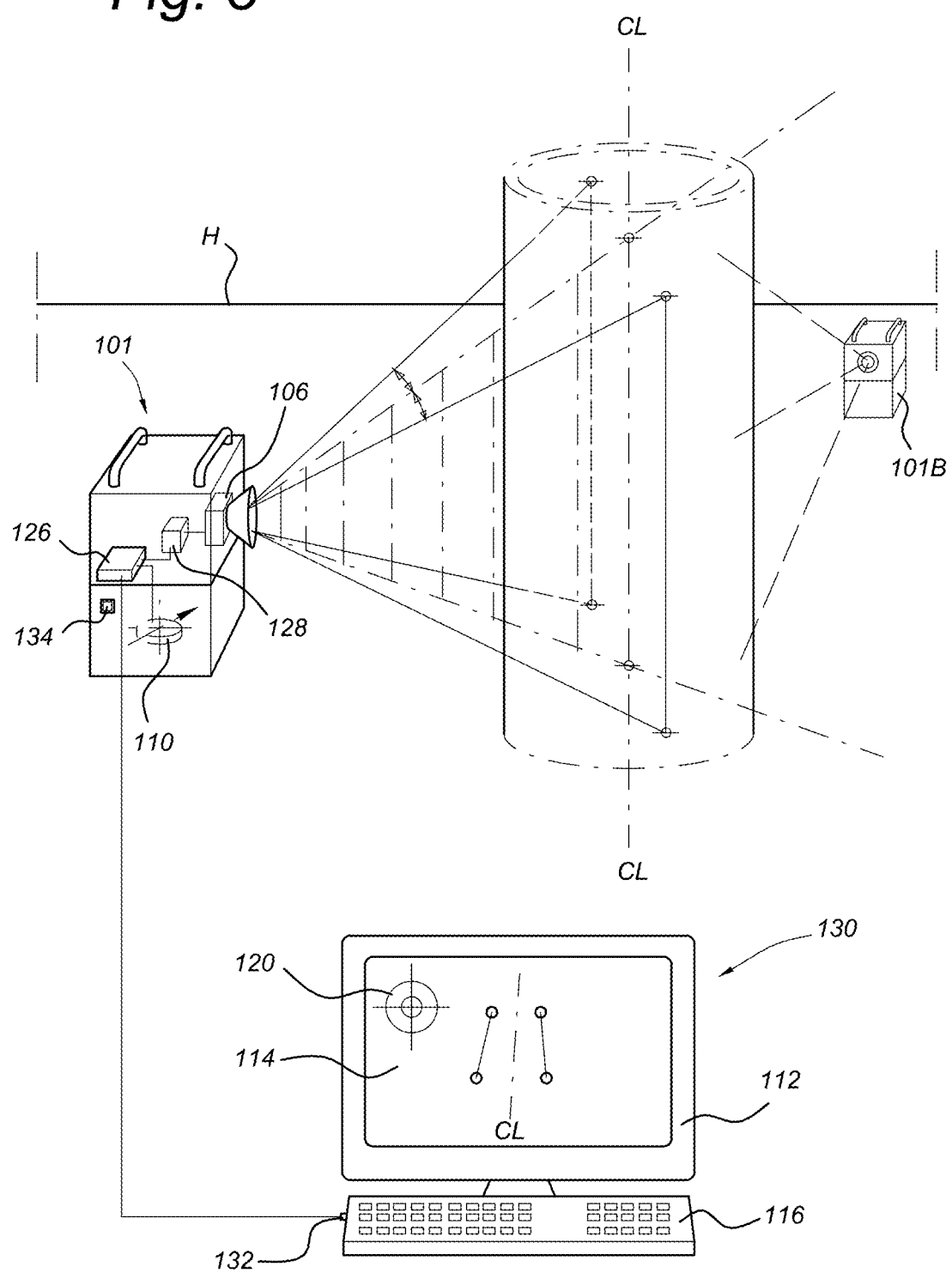
FIG. 3 shows a device and system according to a second embodiment of the invention.

A second embodiment of the invention is shown in FIG. 3, in which like elements to the first embodiment are denoted with similar reference numerals preceded by 100. The device 101 of FIG. 3 comprises a camera 106 and 3-axis north-seeking attitude sensor 110 integrated together in a single portable unit. This means that relative movement between the camera 106 and attitude sensor 110 is prevented. Furthermore, since the device 101 includes its own attitude sensor 110, the momentary attitude of the camera 106 in the geodetic reference frame can be precisely monitored. The device 101 also includes a 1 GB Ethernet switch 126 and a time stamp generator 128. The device 101 communicates through switch 126 with a data processing system 130 which has its own communications port 132. It will be understood that although an Ethernet connection is shown, communication may also take place by wireless means. The data processing system 130 includes an image processing system 112, image display 114 and user interface 116. According to the second embodiment of the invention, the image processing system 112 operates slightly differently to that of the first embodiment in that it identifies left and right edges of the monopile 102. This may be done automatically or with manual pointers as in the first embodiment. Once these edges as observed in the images are determined, the image processing system 112 calculates a plane through the centerline CL of the monopile and the camera center by determining the middle between the planes defined between the camera and the two observed edges. Assuming a surface of revolution, this will be true, irrespective of whether the monopile 102 varies in width and leads to greater result accuracy. Together with the image data from the camera 106, the data processing system 130 also receives attitude data from the attitude sensor. Since this includes heading data as well as data related to pitch and roll, the image processing system 112 can use this data to determine the precise direction from which the image has been made and orientate the centerline CL accordingly. The attitude data is time-stamped by the time stamp generator 128 which also issues a clock signal for the camera 106 to synchronize the image data acquisition. The image data and attitude data are together communicated via the 1 GB Ethernet switch 126 to the data processing system 130. FIG. 3 also shows a second device 101B which provides data for determining the 3D orientation of the centerline CL from another direction. Based on the two readings, the data processing system 130 can determine the attitude of the centerline and display it as described above and shown in FIG. 2E and as an attitude display 120 on the image display 114.

As mentioned above, the device 101 is portable and can be moved to a location from which the required image is to be taken. Since the attitude sensor 110 provides real time attitude data, it may even be hand-held. In order to ensure that the device 101 is correctly calibrated to the geodetic reference frame, it further includes a self calibration button 134. Operation of the self calibration button 134 requires the camera 106 to be directed towards an open expanse of horizon. Activation of the self calibration button 134 generates an image of the horizon H and correspondingly time-stamped attitude data. The image processing system 112 identifies the horizon H either automatically or with the assistance of an operator and compares the viewed horizontal with the value for horizontal measured by the attitude sensor and transmitted as attitude data. If there is a discrepancy, the image display indicates the difference and provides an offset to the device 101 for all further calculations. If the offset is too great, the operator is warned that the device may be faulty.

The embodiment of FIG. 3 has been described for use in a system in which two devices 101, 101B provide attitude data which is combined to determine in real time the attitude of an object. It is also possible to determine the attitude in quasi-real time using a single device 101. In that case, the device 101 is moved around the monopile, either by being moved around on the deck of the barge or by being moved around the monopile aboard a support vessel. In that case, the image data and attitude data can be supplied intermittently to the data processing system 130 which updates the attitude display 120 as new angles of view are provided. This can be sufficiently accurate if the monopile is driven relatively slowly compared with the change in position of the device 101. The data processing system 130 may provide a suitable alarm if insufficient data is provided from a certain direction within a given time.

Figure 4:
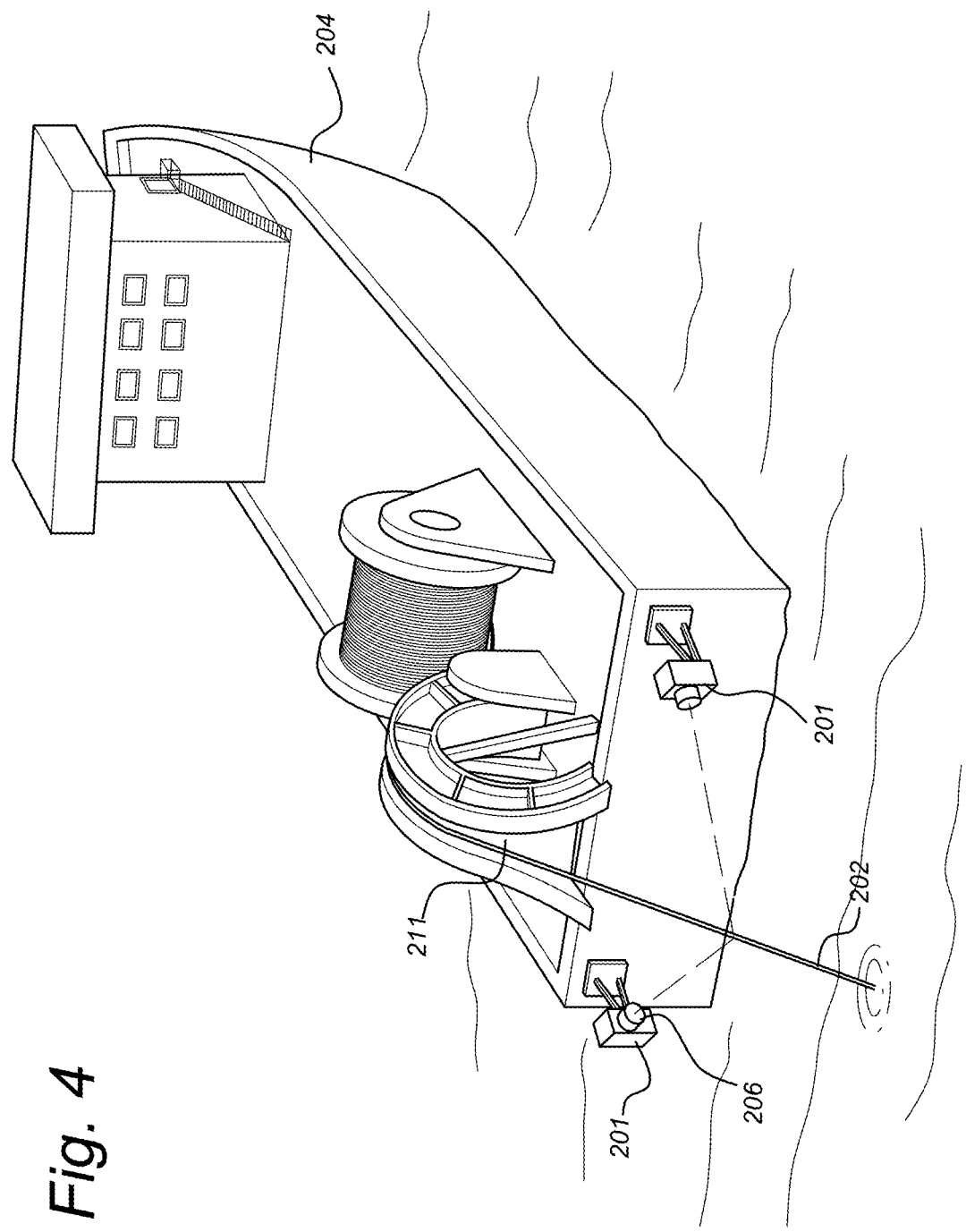
FIG. 4 shows a device according to the invention in use on a cable-lay vessel.

An alternative embodiment of the invention is shown in FIG. 4, for use in determining the angle of departure of a cable during a cable-lay operation. Like elements to the first embodiment are provided with similar references preceded by 200.

Figure 5:
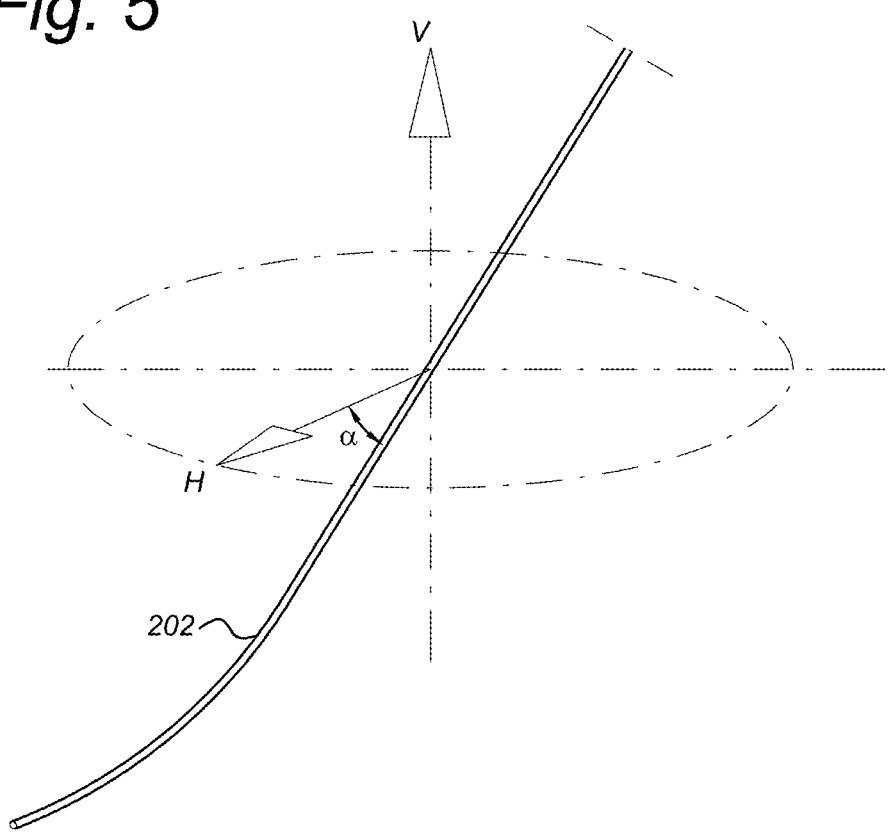
FIG. 5 shows a schematic view of the orientation of the cable of FIG. 4

According to FIG. 4, cable-lay vessel 204 is provided at its stern with a stinger or chute 211 over which cable 202 is deployed to the seabed. Attitude measuring devices 201 according to the invention are mounted overboard at the stern. The attitude measuring devices 201 are similar to the devices 101 of the second embodiment except that they incorporate attitude sensors without north-seeking capability. Cameras 206 are directed towards the cable 202 at the point where this leaves the chute 211. Data acquisition takes place as in the previous embodiments, with image data and attitude data being time stamped and processed to determine the attitude of the cable 202 at its point of departure from the vessel 204 in the geodetic frame of reference. FIG. 5 is a schematic view of the cable 202 at this point, indicating the geodetic vertical direction V and the horizontal plane H. The angle of the cable 202 with respect to its orthogonal projection onto the horizontal plane H is given by $\alpha$. In this configuration, the actual heading of the cable 202 is not required, since this may be determined by other data, including the location of the vessel and the touchdown point of the cable at the seabed.

Thus, the invention has been described by reference to certain embodiments discussed above. It will be recognized that these embodiments are susceptible to various modifications and alternative forms well known to those of skill in the art. In particular, while the above techniques have been described in the context of driving monopiles for offshore wind turbine generators and cable laying, the invention may also be applied to other offshore structures, notably but not limited to offshore oil and gas installations, underwater seabed structures as foundation piles, oil well templates, underwater pipelines, pipe-laying, and underwater installation equipment such as frames and lifting facilities. Many modifications in addition to those described above may be made to the structures and techniques described herein without departing from the spirit and scope of the invention. Accordingly, although specific embodiments have been described, these are examples only and are not limiting upon the scope of the invention.

The invention claimed is:

1. A system for measuring in real time an attitude of an object in a fixed frame of reference relative to earth from a moving frame of reference relative to a vessel, the system comprising:
   a first imaging device configured to acquire a plurality of first images of the object at subsequent times and from a first direction in the moving frame of reference relative to the vessel;
   a second imaging device configured to acquire a plurality of second images of the object at subsequent times and from a second direction in the moving frame of reference relative to the vessel, the second direction having a component perpendicular to the first direction;
   an attitude sensing arrangement configured to measure momentary attitudes of the first and second imaging devices with respect to the fixed frame of reference relative to earth during a period in which the first and second pluralities of images are acquired and configured to generate attitude data; and
   an image processing system configured to analyze and combine the respective pluralities of image and attitude data to determine the real time attitude of the object in the fixed frame of reference relative to earth.

2. The system according to claim 1, wherein the attitude sensing arrangement comprises a three-axis attitude sensor with heading indicator.

3. The system according to claim 1, wherein the attitude sensing arrangement comprises first and second attitude sensors, each integrated with a respective imaging device for movement therewith in the moving frame of reference.

4. The system according to claim 1, wherein the first and second imaging devices are mounted aboard the vessel and the attitude of the object is given with respect to a heading of the vessel.

5. The system according to claim 1, wherein the first and second imaging devices are mounted aboard the vessel and the attitude of the object is given with respect to a geodetic coordinate frame.

6. The system according to claim 1, further comprising an attitude display providing a real-time representation of the attitude of the object.

7. The system according to claim 1, further comprising a user interface and an image display and the image processing system is configured to enable a user to manually pick a portion of an image of the object on the image display for use in determining the attitude of the object.

8. The system according to claim 1, further configured to determine, via the image processing system, verticality of a pile having a central axis, wherein the image processing system is further configured to:
   determine left and right border planes of the pile from the first imaging device and identify a location of a first plane passing through the first imaging device and being equidistant from the observed left and right border planes;
   determine left and right border planes of the pile from the second imaging device and identify a location of a second plane passing through the second imaging device and being equidistant from the observed left and right border planes;
   identify an intersection of the first and second planes observed from both the first and second imaging devices to determine the attitude of the central axis of the pile.

9. The system according to claim 1, further configured to determine, via the image processing system, verticality of a pile having a central axis, wherein the image processing system is further configured to:
   determine a border plane of the pile from a first image acquired by the first imaging device;
   determine a further border plane of the pile from a second image acquired by the second imaging device;
   determine the attitude of the central axis of the pile based on positions and orientations of the border plane and the further border plane.

10. The system according to claim 9, wherein the image processing system is further configured to:
    determine only one border plane of the pile in the image data from the first imaging device, using a single edge of the pile visible in at least one image acquired by the first imaging device;
    determine only one further border plane of the pile in the image data from the second imaging device, using a single further edge of the pile visible in at least one image acquired by the second imaging device.

11. The system according to claim 9, wherein the pile is a tapered pile defining an outer surface that is inclined at a non-zero taper angle relative to the central axis of the pile, wherein the image processing system is configured to receive a predetermined value for the taper angle, and to determine the attitude of the central axis of the pile based on the positions and orientations of the border plane and the further border plane, and on the predetermined value for the taper angle.

12. A device configured to measure in real time an attitude of an object in a fixed frame of reference relative to earth from a moving frame of reference relative to a vessel, the device comprising:
    an imaging device configured to acquire a plurality of images of the object at subsequent times in the moving frame of reference relative to the vessel;
    an attitude sensor configured to measure momentary attitudes for the imaging device with respect to the fixed frame of reference relative to the earth during a period in which the plurality of images are acquired and configured to generate attitude data, the attitude sensor having a dynamic accuracy of better than 1.0 degrees, at least in pitch and roll directions;
    a clock, arranged to time stamp the attitude data; and
    a communication port configured to transmit data to a data processing system to determine in real time the attitude of the object in the fixed frame of reference relative to earth.

13. The device according to claim 12, wherein the data processing system is remote from the imaging device and the image data and attitude data is transmitted to the data processing system.

14. The device according to claim 12, wherein the device is portable and the imaging device and the attitude sensor are fixed to each other to prevent relative movement.

15. The device according to claim 12, further comprising a global navigation satellite system device providing position data for the imaging device.

16. A vessel comprising:
a device configured to measure in real time an attitude of an object in a fixed frame of reference relative to earth from a moving frame of reference relative to a vessel, the device comprising:
an imaging device configured to acquire a plurality of images of the object at subsequent times in the moving frame of reference relative to the vessel;
an attitude sensor configured to measure momentary attitudes for the imaging device with respect to the fixed frame of reference relative to earth during a period in which the plurality of images are acquired and configured to generate attitude data, the attitude sensor having a dynamic accuracy of better than 1.0 degrees, at least in pitch and roll directions;
a clock, arranged to time stamp the attitude data; and
a communication port configured to transmit data to a data processing system to determine in real time the attitude of the object in the fixed frame of reference relative to earth.

17. A method of determining an attitude of an offshore object in a fixed frame of reference relative to earth based on observations from a vessel moving in a moving frame of reference relative to a vessel, the method comprising:
receiving, from a first imaging device, a plurality of first images including the object acquired from the moving frame of reference relative to the vessel in a first direction and at subsequent times to produce a first image data set;
receiving, from a second imaging device, a plurality of second images including the object acquired from the moving frame of reference relative to the vessel in a second direction not co-linear with the first direction and at subsequent times to produce a second image data set;
collecting, at an attitude sensing arrangement, attitude data representing a relative attitude of the moving frame of reference relative to the vessel with respect to the fixed frame of reference relative to the earth, during a period in which the first and second image data sets are acquired, for each image data set;
analyzing and combining, at the image processing system, the respective image data and attitude data to determine the attitude of the object in the fixed frame of reference relative to earth.

18. The method according to claim 17, wherein the object is an offshore pile and the attitude determines a verticality of the offshore pile during driving thereof.

19. The method according to claim 17, wherein the object is a cable or pipe from a vessel and the attitude determines a departure trajectory of the cable or pipe from the vessel during laying thereof.

20. A non-transitory computer readable medium storing instructions which when executed by a processor, causes the processor to:
receive, from a first imaging device, a plurality of first images including an object acquired from a moving frame of reference relative to a vessel in a first direction and at subsequent times to produce a first image data set;
receive, from a second imaging device, a plurality of second images including the object acquired from the moving frame of reference in a second direction not co-linear with the first direction and at subsequent times to produce a second image data set;
collect attitude data representing relative attitudes of the moving frame of reference relative to the vessel during a period in which the first and second image data sets are acquired with respect to a fixed frame of reference relative to the earth for each image data set; and
analyze and combine the respective image data sets and attitude data to determine the attitude of the object in the fixed frame of reference relative to earth.

21. The non-transitory computer readable medium according to claim 20, comprising further instructions, which when executed by the processor causes the processor to:
acquire time-stamped first and second image data sets;
acquire time-stamped attitude data;
determine a central plane or surface tangent plane of the object for each of the first and second image data sets;
combine attitude data with the central planes or surface tangent planes for the first and second image data sets, for producing an estimate of the attitude; and
display the estimated attitude.

* * * * *